United States Patent
Lim et al.

(10) Patent No.: US 8,180,406 B2
(45) Date of Patent: May 15, 2012

(54) SYSTEMS AND METHODS OF SYNCHRONIZING RING TONE CYCLES AND DELIVERY OF DTMF TONES

(75) Inventors: Miranda Bing Ying Lim, Nepean (CA); Valentina Iqorevna Kramarenko, Toronto (CA)

(73) Assignee: Research In Motion Limited, Waterloo (CA)

(*) Notice: Subject to any disclaimer, the term of this patent is extended or adjusted under 35 U.S.C. 154(b) by 29 days.

(21) Appl. No.: 12/903,538

(22) Filed: Oct. 13, 2010

(65) Prior Publication Data

US 2011/0263223 A1    Oct. 27, 2011

Related U.S. Application Data

(60) Provisional application No. 61/328,146, filed on Apr. 26, 2010.

(51) Int. Cl.
*H04M 1/00* (2006.01)
(52) U.S. Cl. ............. 455/567; 455/414.1; 455/411; 455/702; 340/7.58; 340/7.59
(58) Field of Classification Search .... 455/412.2–414.4, 455/567, 466; 340/287–294, 7.58–7.59; 379/67.1–74
See application file for complete search history.

(56) References Cited

U.S. PATENT DOCUMENTS

| | | | |
|---|---|---|---|
| 5,151,972 A | 9/1992 | Lorenz et al. | |
| 5,396,548 A | 3/1995 | Bayerl | |
| 5,400,393 A * | 3/1995 | Knuth et al. | 379/88.27 |
| 5,502,762 A | 3/1996 | Andrew et al. | |
| 5,604,797 A | 2/1997 | Adcock | |
| 5,768,349 A * | 6/1998 | Knuth et al. | 379/88.22 |
| 6,574,468 B1 | 6/2003 | Tanaka | |
| 7,983,660 B2 * | 7/2011 | Bao et al. | 455/414.1 |
| 2004/0162111 A1 | 8/2004 | Kim | |
| 2007/0201630 A1 * | 8/2007 | Smith et al. | 379/67.1 |
| 2009/0181648 A1 * | 7/2009 | Bao et al. | 455/414.1 |
| 2011/0263223 A1 * | 10/2011 | Lim et al. | 455/411 |

FOREIGN PATENT DOCUMENTS

| | | |
|---|---|---|
| EP | 1209938 A1 | 5/2002 |
| EP | 2355536 A1 | 8/2011 |
| JP | 41567852 A | 5/1992 |

OTHER PUBLICATIONS

Extended European Search report dated Nov. 15, 2011. In corresponding application No. 10187476.6.

* cited by examiner

*Primary Examiner* — Kent Chang
*Assistant Examiner* — Keith Fang
(74) *Attorney, Agent, or Firm* — Novak Druce + Quigg LLP

(57) ABSTRACT

Mobile devices use a PBX and application servers associated with the PBX to access voice services. Some mobile devices can support simultaneous data and voice channels, with the PBX and application server respectively. Where a data channel is unavailable, a control and status updating mechanism is needed. One approach is to signal over the voice channel with DTMF tones. DTMF tones should be timed to cause the tones to arrive at the mobile device during a pause period of a ring cycle. However, it also is desirable to avoid unnaturally long silence periods or other pauses during system usage. Aspects relate to enhancing a user experience in these situations and successful transmission/reception of control and status information over a voice channel using DTMF tones.

5 Claims, 6 Drawing Sheets

SYSTEMS AND METHODS OF SYNCHRONIZING RING TONE CYCLES AND DELIVERY OF DTMF TONES

CROSS-REFERENCE TO RELATED APPLICATIONS

This application claims priority benefit of U.S. provisional application No. 61/328,146, filed on Apr. 26, 2010. U.S. provisional application No. 61/328,146, is fully incorporated by reference herein.

BACKGROUND

1. Field

The present application relates to voice telephony, and more particularly to control and status signaling to and from mobile devices over voice channels, such as in third party call control.

2Related Art

Voice telephony remains a major application of interest for business and personal use. In an example corporate setting, a telephony installation at a site can have a large number of users connected to a Private Branch Exchange (PBX) server, which can interface those users to a smaller number of outside lines (e.g., an E1 or T1 line) (a PBX can be implemented using a server with telephony cards for example). A PBX can interface with other servers and systems, such as one or more application servers that can provide enhanced services to devices connected to the PBX, such as mobile devices. For example, a PBX can interface with an application server over an IP connection, using SIP signaling. Services provided by an application server can include voice mail, single number reachability, call forwarding, park, and conferencing, for example. PBX systems also can communicate with each other over trunk lines, and packet networks, depending on implementation.

A PBX can perform services for a voice call, based on direction from an application server. For example, a PBX can initiate an outgoing call to a number specified by an application server using SIP signaling to the PBX, and bridge a mobile device that requested such call. Continuing this example, it would be desirable to provide status information to the requesting mobile device. Such status information would include information such as whether the remote party phone has started to ring or not. Still further, initiating commands, such as call transfer, and sending status information during progress of such commands also desirably is available. In absence of a data channel that can be maintained concurrently with a voice channel, this information can be communicated using DTMF tones. However, a number of considerations desirably should be addressed if using DTMF tones for such purposes, and aspects herein relate to alleviating some of these concerns.

BRIEF DESCRIPTION OF THE DRAWINGS

Reference will now be made, by way of example, to the accompanying drawings which show example embodiments of the present application, and in which.

DESCRIPTION

In many cases, modern mobile devices, such as phones, smartphones, and other network-enabled devices can access both a data network and a voice network (depending on technology, access of each network type may occur concurrently or interleaved). It is becoming increasingly desirable, especially for corporate users, to be able to use their mobile phones in a manner similar to their deskphones, such as having similar functionality, one number reachability, and so on. Such capabilities can be provided to mobile devices through an application server that can send and receive status information and control commands over a data channel with the mobile device. If a data channel is not currently available, DTMF tones can be sent over a voice channel for these purposes.

Some mobile devices have trouble detecting DTMF tones during a ring portion of a ring tone cycle that the device is locally generating. So, it is desirable to have the mobile device to receive any such tones during a pause period of such a ring tone.

A variety of approaches can be implemented directed such timing, and examples of some preferred approaches are described herein. Another consideration is to avoid having a user of the mobile device hear tones being sent for such control and status purposes.

Figure 1:
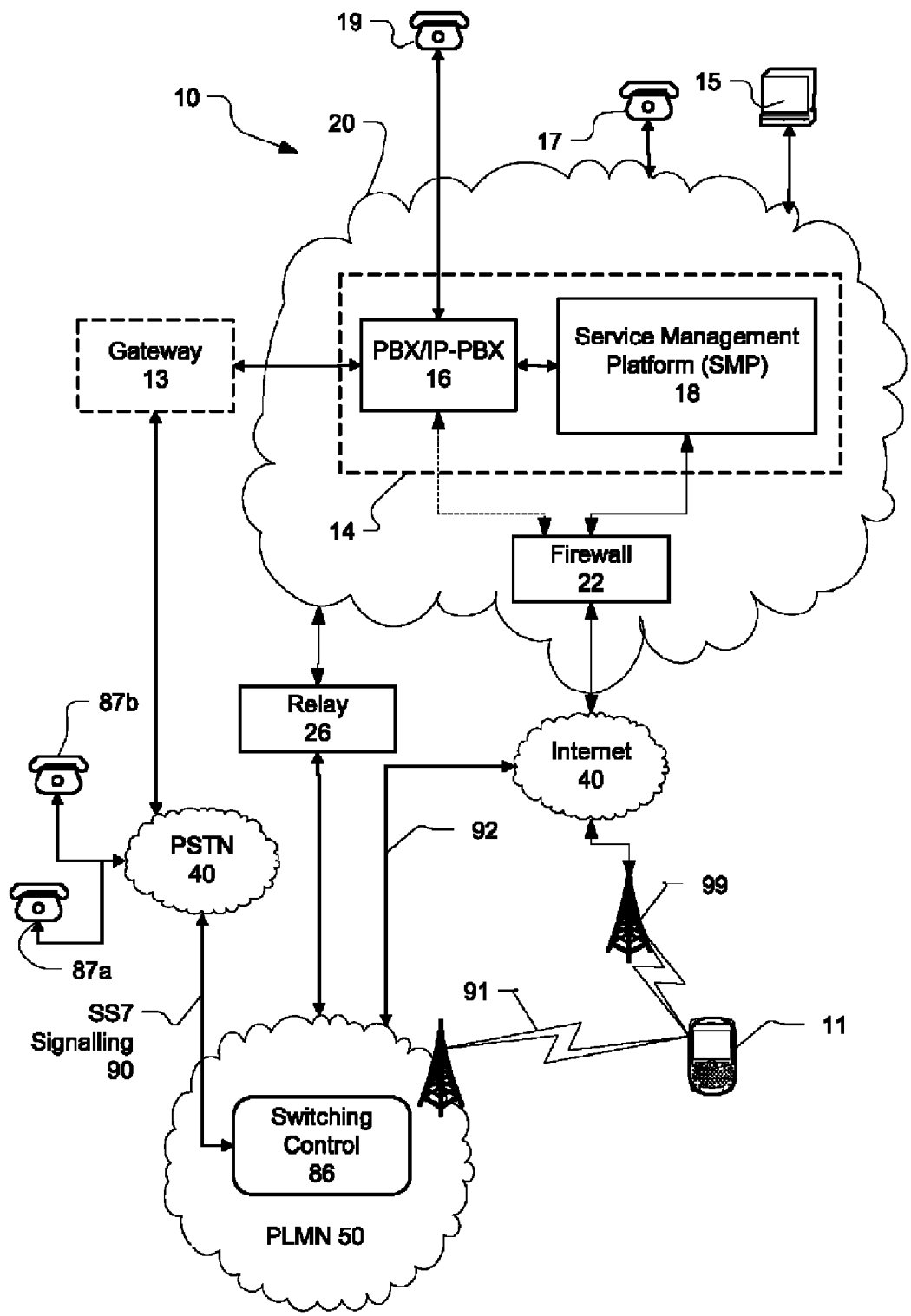
FIG. 1 shows, in block diagram form, an example arrangement in which voice calls involving mobile devices can be setup, and which involves an enterprise communications platform.

FIG. 1 depicts an example arrangement, which will be used in the following description. In some aspects, this description concerns an approach to reducing a setup time for a call involving a wireless device and carried on a transport that includes elements of the Public Switched Telephony Network (PSTN). The elements of FIG. 1 are introduced, followed with background to provide context to the particular examples that follow.

FIG. 1 depicts an arrangement where a PBX 16 can exist within a corporate network. PBX 16 can be coupled to the Public Switched Telephone Network (PSTN) 40, such as via a T1 trunk, or through a gateway 13 that interfaces between the PSTN and a packet network technology. Gateway 13 also can convert between packet network signaling, such as H.245 or SIP to PSTN signaling such as ISDN signaling. PBX 16 also can be coupled to the Internet 40, or to other packet networks, through a firewall 22, and other network equipment such as routers and switches (not separately depicted). PBX 16 also can have a connection to both the PSTN and one or more packet networks.

Traditionally, a PBX (e.g., PBX 16) provides telephony services for a closed group of private telephones, for example, within an enterprise or a hotel. However, in many cases the services to the private telephone desirably could also be extended out to a mobile device that communicate via third party networks, such as wide area cellular networks, or through wireless local area networks. In these situations SMP server 18 may be added as an adjunct to the PBX and can take an active role in providing services to mobile devices.

SMP server 18 can be connected to PBX 16 through a packet-switched connection that can use the Internet Protocol (IP).

PSTN 40 can communicate with Public Land Mobile Network (PLMN) 50, and by particular example, with a switching control 86 within PLMN 50. Such communication is for accepting calls from PLMN 50 to be carried on PSTN 40, and vice versa, as an example. SS7 signalling can be employed between PSTN 40 and PLMN 50. PSTN 40 is depicted to have telephones 87a and 87b coupled thereto. Other implementations can include multiple gateways that translate between or among different signaling protocols.

PLMN 50 communicates with a mobile device 11. Communication between PLMN 50 and mobile device 11 can take place using a wide variety of technologies, some of which are capable of supporting only voice traffic, either voice traffic and data traffic, or simultaneous voice and data traffic to/from mobile device 11. PLMN 50 also can use Internet 40 to receive/send traffic to and from corporate network 20, as indicated by communication link 92. Communication between network 20 and PLMN 50 also may be carried via a relay 26.

Mobile device 11 includes one or more radio transceivers and associated processing hardware and software to enable wireless communications with the PLMN 50 and optionally a WLAN. In various embodiments, the PLMN 50 and mobile device 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within PLMN 50 as well as into other PLMNs (i.e., that the depicted PLMN 50 represents one or more such wireless access networks that operate according to what a person of ordinary skill would understand as broadband cellular access technologies).

For example, in some instances, a dual-mode mobile device 11 and/or the enterprise network 20 can be configured to facilitate roaming between the PLMN 50 and a WLAN, and are thus capable of seamlessly transferring sessions (such as voice calls) from a connection with a cellular interface of a dual-mode device to a WLAN interface of such a dual-mode device, and vice versa.

GSM signaling 91 can be implemented using the Fast Associated Control Channel (FACCH). FACCH is a logical channel on a digital traffic channel that can be used to send urgent signaling control messages. The FACCH channel sends messages by replacing speech data with signaling data for short periods of time. In GSM, two special reserved bits are used to inform the receiving device if the data in the current time slot is digitally coded subscriber traffic or alternatively a FACCH message. Switching control 86 manages the conversion between GSM signaling 91 and SS7 signaling 90 (for clarity, a network of base stations operating within PLMN 50 is not separately depicted, and usually, there is a connection between switching control 86, and one or more base station elements, where device 11 can be connected to such base station elements. GSM signaling can be relayed through the base station to a termination point in switching control 86.)

In some embodiments, PBX 16 may be connected to one or more conventional analog telephones 19. The PBX 16 is also connected to (or part of) the enterprise network 20 and, through it, to telephone terminal devices, such as digital telephone sets 17, softphones operating on computers 15, and so on. Within the enterprise network, each individual may have an associated extension number, sometimes referred to as a PNP (private numbering plan), or direct dial phone number. Calls outgoing from PBX 16 to PSTN 40 or incoming from PSTN 40 to PBX 16 can be circuit-switched calls (typically in the absence of gateway 13). Gateway 13 also can be considered part of enterprise network 20, and a boundary of such enterprise network 20 depicted in FIG. 1 is primarily for convenience. Within the enterprise, e.g. between the PBX 16 and terminal devices, voice calls are increasingly packet-switched calls, for example Voice-over-IP (VoIP) calls.

SMP server 18 can perform some aspects of messaging or session control, like call control and advanced call processing features. SMP server 18 may, in some cases, also perform some media handling. Collectively, SMP server 18 and PBX 16 may be referred to as the enterprise communications platform (server), generally designated 14. It will be appreciated that the enterprise communications platform 14 and, in particular, SMP server 18, can be implemented on one or more servers having suitable communications interfaces for connecting to and communicating with the PBX 16, and other network connections. Although SMP server 18 may be implemented on a stand-alone server, it will be appreciated that it may be implemented into an existing control agent/server as a software component comprising instructions configuring a processor, operating with other software components to implement the functionality attributed to it. As will be described below, SMP server 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs).

One of the functions of enterprise communications platform 14 is to extend the features of enterprise telephony to the mobile devices 11. For example, the enterprise communications platform 14 cay allow mobile device 11 to perform functions akin to those normally available on a standard office telephone, such as the digital telephone set 17 or analog telephone set 15. Example features may include direct extension dialing, enterprise voice mail, conferencing, call transfer, call park, etc.

The depicted system may include a number of enterprise-associated mobile devices (device 11 is depicted). Device 11 can be a device equipped for cellular communication through the PLMN 50, or a dual-mode device capable of both cellular and WLAN communications.

Enterprise network 20 typically includes a number of networked servers, computers, and other devices. For example, enterprise network 20 may connect one or more desktop or laptop computers 15 (one shown). The connection may be wired or wireless in some embodiments. The enterprise network 20 may also connect to one or more digital telephone sets 17 (one shown).

One approach is estimate start of a local ring tone on a mobile device based on a time stamp in a message received at a server from the mobile device, through a data channel. However, message propagation delay is difficult to determine from such a time stamp. For example, if there is significant delay on the voice channel, and that delay is different from a data channel delay, then the timestamp may not be especially helpful. For example, where a WiFi connection is used for the data channel, a delay on the voice channel quite likely would be different. Therefore in preferred aspects herein, one or more DTMF tones sent from the mobile device to the PBX (server) are used by the server to estimate delay on the voice channel, and consequently when to send a given tone to the mobile device.

In a first example, mobile device 11 initiates a call (such as by sending a notification or invite over a data channel) received by server 18. In this situation, mobile device 11 sends verification tone(s) after the cellular portion of the voice channel is established. Where synchronization of ringing is to occur, mobile device 11 also restarts a local ring tone (ringback tone) that is audible on mobile device 11. Thus, server 18, when receiving the verification tone (or if tones, then preferably the first tone received) serves as a marker for when mobile device 11 restarted the ring cycle. Using this basis for determining the start of the ring cycle, server 18 then times sending of the DTMF tones indicative of status or control information to arrive at mobile device 11 during ring off periods.

The verification tone(s) may need to be sent repeatedly. In one preferred example, when repeatedly sending verification tones, different tones can be used for each, or a cycle of verification tones can be used. In this way, server 18 also is provided with information about when mobile device 11 restarted its ring cycle. An example of such a preferred approach is that a first set of verification tones to be sent are DTMF tones for the numerals 2, 3, 4, 6, and 0. Three seconds after sending theses initial tones, tones for numerals 1, 7, 8, 9, and 0 are sent. If the verification tone continues to need to be repeated, then 3 seconds later, the original tones for numerals 2, 3, 4, and 6 are again transmitted, and so on with the second set of digits sent, if necessary. This example is more appropriate for situations where a ring cycle has a time period roughly modulo 6. In this way, server 18 can determine based on which digits are received, a modulo value representative of when mobile device 11 restarted its ring cycle.

Upon having an estimate as to the timing of a ring cycle occurring on device 11, server 18 also can further select a time within the pause period to target. In many typical cases, the pause period is 4 seconds. In one preferred case, where the verification sequence is received by server 18 (tones for numerals 2, 3, 4, 6 in the above example), a guard time after an estimated start of the pause cycle and before an estimated end of the pause cycle is around 50 ms. For a second verification tone sequence (1, 7, 8, 9 in the above example), a guard time can be selected as 100 ms. Guard times can be selected based on network and device specific measurements and feedback from users.

Figure 3:
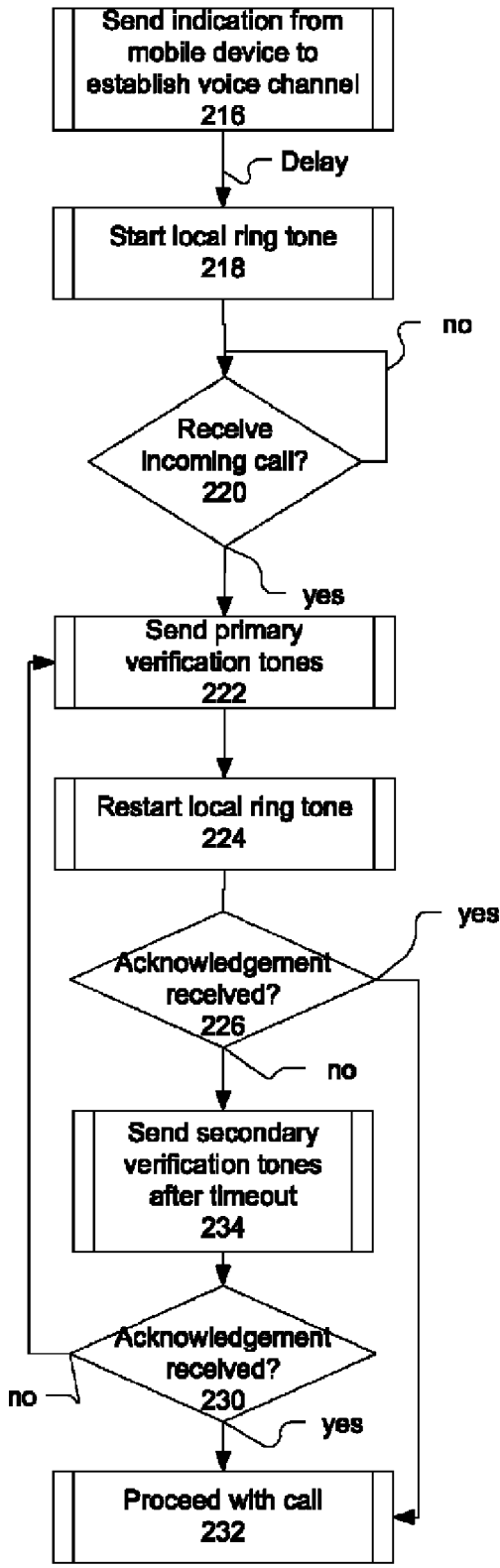
FIG. 3 depicts a second method that can be implemented on a mobile device for use in synchronizing ring tone cycles with DTMF tone signaling.
Figure 4:
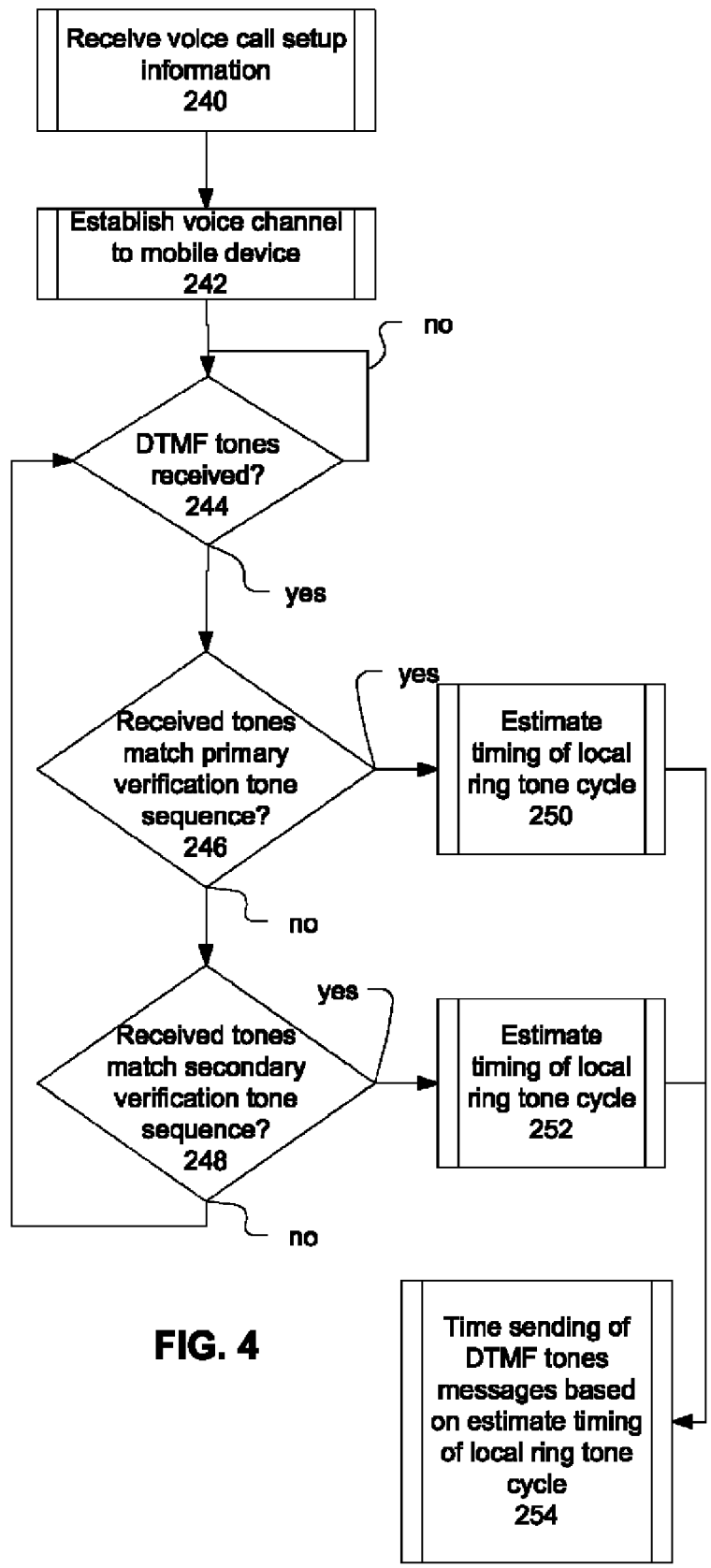
FIG. 4 depicts a server counterpart method for the method of FIG. 3.

FIGS. 3 and 4 depict another example where server 18 can initiate the voice channel to mobile device 11, and considerations that occur in this scenario. FIG. 3 depicts a device 11 method, which includes that the device 11 can send an indication that a voice channel is to be established (216), and after a delay (e.g., 1.5 s) a local ring tone is started (218), Subsequently, device 11 receives a call (request to establish a voice channel) (220), and once the channel is established, device 11 sends a primary verification tone sequence (222) and restarts the local ring tone cycle (224). If an acknowledgement is not received within a timeout period, a secondary verification tone sequence is sent (234). The primary and secondary verification tone sequences can correspond to the numerical sequences described above. If an acknowledgement is received (either at 226 or at 230), then the call can proceed (232). If not, then the primary verification tone sequence is sent again (222) after a pre-determined delay. A second concurrent call can be initiated, such as by depicted process (233), which can be composed of sending (216), starting local ring tone (218) and stopping the local ring tone, after sending (216) and waiting for arrival of a remote ring tone status update.

FIG. 4 depicts a server-side method to correspond with the method of FIG. 3. Server 18 receives voice call setup information (240) and establishes a voice channel to device 11. After the channel is established, server 18 waits to receive DTMF tones on the voice channel (244), and upon receiving such tones, server 18 compares the tones received with a primary verification code sequence, and if matching, then server 18 can estimate (250) a start of the ring tone cycle on device 11 based on this received sequence. If tones were received, but do not match the primary sequence, then server 18 compares the tones received to a secondary verification tone sequence (248), and if matching, server 18 estimates (252) a timing of the ring cycle on device 11 accordingly. In one example, there is known, pre-defined delay between when device 11 would send the primary and secondary verification tone sequences, such that estimates in (252) and (248) can be conducted accordingly. Further DTMF tones sent are timed (254) based on the estimates made in either 252 or 248.

In other call situations, mobile device 11 may receive a trigger tone indicating whether or not an authentication code (previously provided to mobile device 11) should be sent on the voice channel or not. Even if mobile device 11 is not to respond with the full authentication code, it still will respond with an acknowledgement tone(s). Using the example of sending the authentication code, mobile device 11 preferably sends tones for the numerals 0, 1 and the authentication code. Mobile device 11 also generally concurrently with sending these tones also restarts the local ring tone. Server 18 uses these tones, when received, as an indication when mobile device 11 restarted its ring tone, and bases timing decisions for tones to be sent to mobile device 11 from this estimated ring cycle restart time.

In these situations, there is some delay on the voice channel, which preferably is determined empirically, and can vary depending on how mobile device 11 is constructed, and the network or networks that it uses.

In the situation where there is a trigger tone being sent from server 18 to mobile device 11, there is no synchronization strategy in place when that trigger tone is to be sent to mobile device 11. However, it also is preferably that a user of mobile device 1 does not hear the trigger tone. As such, preferably mobile device 11 stops its local ring tone cycle when the cellular leg to the device is connected, so that it can detect the trigger tone, but stays muted so that the user will not actually hear this tone. So similar to the previous example, mobile device 11 can send an invite on the data channel, wait a period of time (e.g., 1.5 seconds), and then begin generating a local ring tone. Upon connection of the cellular leg of the voice channel, mobile device 11 would stop the local ring tone. After getting a trigger tone, and responding, mobile device 11 would restart the local ring. Preferably, mobile device 11 also introduces a delay of another 100 ms to avoid allowing the user to hear a tail portion of the trigger tone.

However, if the trigger tone is not received timely, a long period of silence would transpire, while the trigger tone is resent (retried) from server 18. In one example, the ring cycle is 4 seconds off, 2 seconds on.

Situations where retried trigger tones may be heard include where a first trigger tone or the response to that first trigger tone was lost. If the first trigger tone was lost, then mobile device 11 would not have restarted ringing, but if the response was lost, then the device would have restarted ringing, but server 18 would not have received the response and would not be able to confirm a start time of such ringing.

Under these circumstances, server 18 will assume that the trigger tone did reach device 11, and that ringing was restarted. Server 18 will estimate when the ringing started based on when it sent the trigger tone, plus a processing delay. Based on a known pattern of the ring tone, it will schedule further tones with a goal to make the tones arrive at what it estimates to be a pause period. A timeout or numerical limit to retry the trigger tone can be enforced (such as 3 times).

Figure 2:
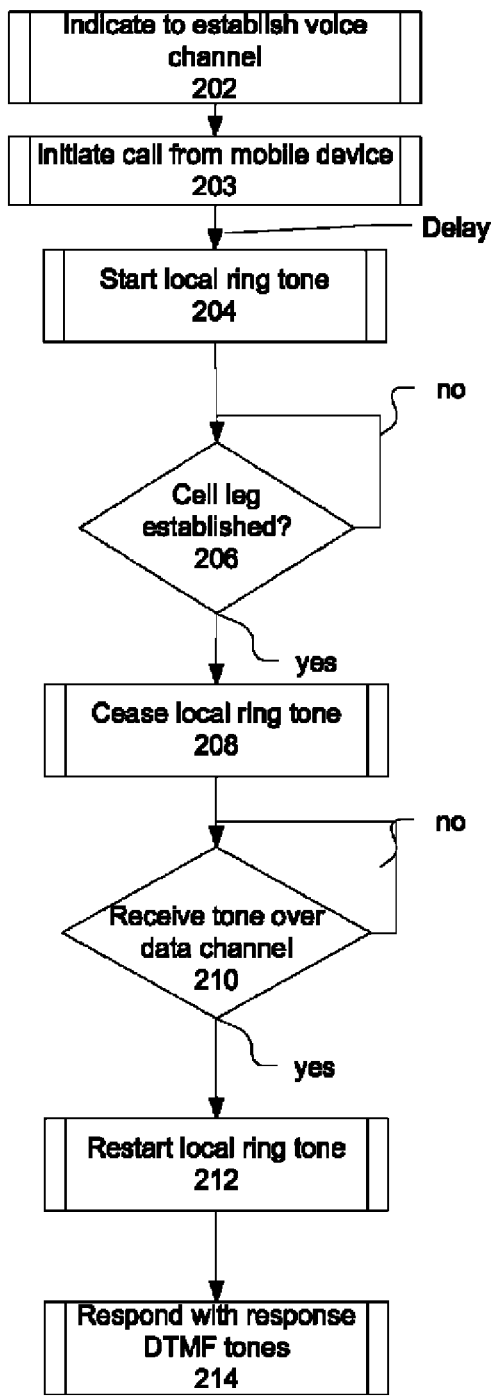
FIG. 2 depicts a first method that can be implemented on a mobile device for use in synchronizing ring tone cycles with DTMF tone signaling.
Figure 5:
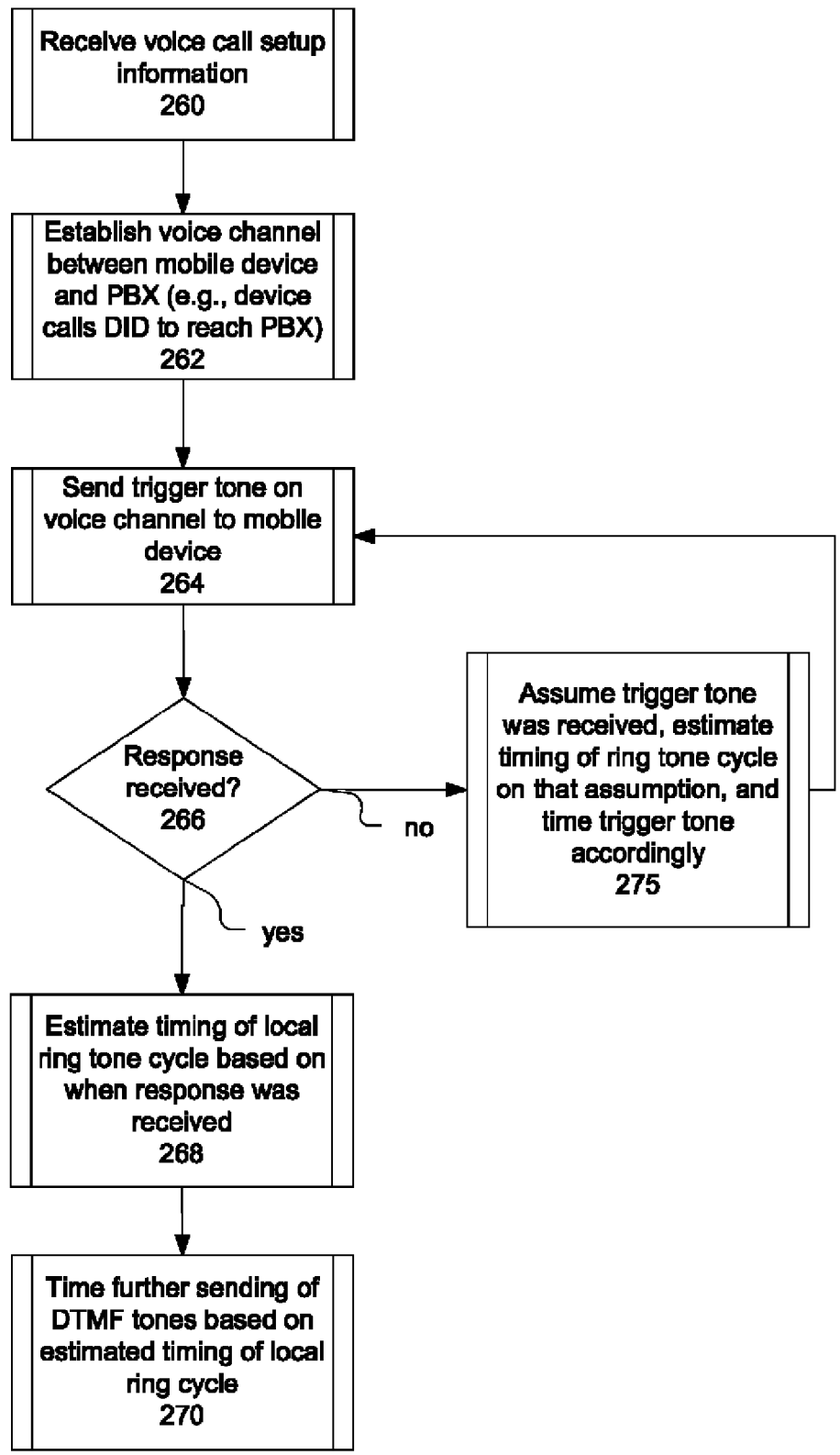
FIG. 5 depicts a server counterpart method for the method of FIG. 2.

FIGS. 2 and 5 depict example methods relating to a device calling into a PBX. FIG. 2 depicts that mobile device 11 can indicate to server 18 that a voice channel is to be established with device 11, and can receive data, such as a DID number to call and an authentication token. Device 11 can thereafter initiate establishment of the voice channel to a DID number (203) (e.g., such as one provided from server 18). After a wait period (e.g., 1.5 seconds), begins (204) a locally audible ring tone cycle at device 11. Subsequently, a cellular leg of the call is found to be established (206), and responsively, the local ring tone is ceased (208). Device 11 waits for one or more tones over the data channel (210), and when received, restarts the local ring tone (212) and responds with one or more response DTMF tones (214). The restarting (212) and responding (214) should occur within a functionally short interval, so that server 18 can estimate when device 11 restarted the ring tone cycle based on when it receives the response tones sent in 214 (and on measures and/or estimates of delay on the voice channel). An amount of time between 212 and 214 may vary among implementations, but preferably, 212 and 214 occur within a short period of time, such as 100 ms.

FIG. 5 depicts a server 18 counterpart method for the method depicted in FIG. 2. In FIG. 5, server 18 receives (260) voice call setup information, such as SIP invite. Subsequently, a voice channel is established to device 11, such as by device 11 calling a DNIS number available to PBX 16. Server 18 then causes a trigger tone to be sent (264) on the voice channel. When a response comprising one or more tones is received (266), the timing of when the tones are received is used to estimate (268) the timing of when device 11 restarted its local ring cycle, and timing of further tones to be sent to the device are based on this time estimate. If the response was not received, then server 18 assumes that the trigger tone was received, but that the response to it was lost, and estimates a timing of the ring tone cycle based on an estimate of a round trip delay to and from device 11, plus some processing delay at device 11, and times a subsequent trigger tone to be sent (264) accordingly. A retry limit of trigger tones can be enforced, such as a limit of 3 times.

The above description applies to initiating a first voice connection with a given mobile device, e.g., device 11), if device 11 wants to make another call, then the authentication/verification procedure can be dispensed, since the existing voice channel has served that end. Thus, for subsequent services, the following aspects can be implemented for synchronizing tones with ring cycles. A subsequent call can be signaled via DTMF or via a data channel, if available.

In DTMF case, device 11 sends 2nd outgoing call command digits to server 18 one digit at a time. Once device completes sending the last digit of the 2nd outgoing call feature command, it stops a local ring tone, and waits for arrival of a remote ring tone status update. Server 18 sends this status update when ring synchronizing is required. Device 11 restarts its local ringing cycle when it receives the remote ring status message. Server 18 can estimate when device 11 restarted or started its local ring based on when it sent the remote ring status message. A timestamp for when it sent the message can be recorded, and estimates of network delay and processing time can be added to that time in order to estimate when the local ring at device 11 started.

Device 11 may not always detect or receive the remote ring status message. Device 11 however can restart ringing after a delay selected based on an expected delay to receive the remote ringing status message. The device thus should restart ringing based on an estimate of a typical delay to receive such status message. For example, device 11 can wait for X seconds, where X can be selected at 5 seconds, for example. Selecting this time involves a tradeoff between avoiding having the user hear undesirable tones and having a long silence that can make a user wonder what the call status is.

Preferably, after receiving remote ring status message device 11 restarts the local ring with a delay to avoid user hearing a tail portion of the trigger tone(s) and to avoid a user hearing an answered status tone when early media is present. For example, when calling into a conference service, early media may connect quickly. One example difference is with a call transfer case, where device 11 will not start ringing unless it receives the remote ring status message.

An example of such an approach is found with respect to FIG. 5, in which information about a further party to be called can be received (272), and a call to that party can be made. When the call to the further party begins to ring, a remote ring notification can be sent (274) to the source of the information received (272). When further information is to be sent to that device, the local ring cycle on that device (initiated responsive to remote ring notification (274) is estimated (273), in order to time delivery of such information, such as by DTMF tones, to arrive during pause periods of the local ring cycle.

The term "synchronization" has been used to refer to estimating timing of DTMF tone delivery to coordinate with a ring cycle on a mobile device (e.g., in order to increase a likelihood that a tone sent would arrive during a pause or ring off period of the tone cycle). The usage of synchronization does not imply or require any absolute timing relationship or that there is a guarantee that tones will be delivered during an off period, but rather more generally refers to approaches that heuristically attempt to increase the likelihood of causing tones to arrive at appropriate times at a mobile device, for example.

Figure 6:
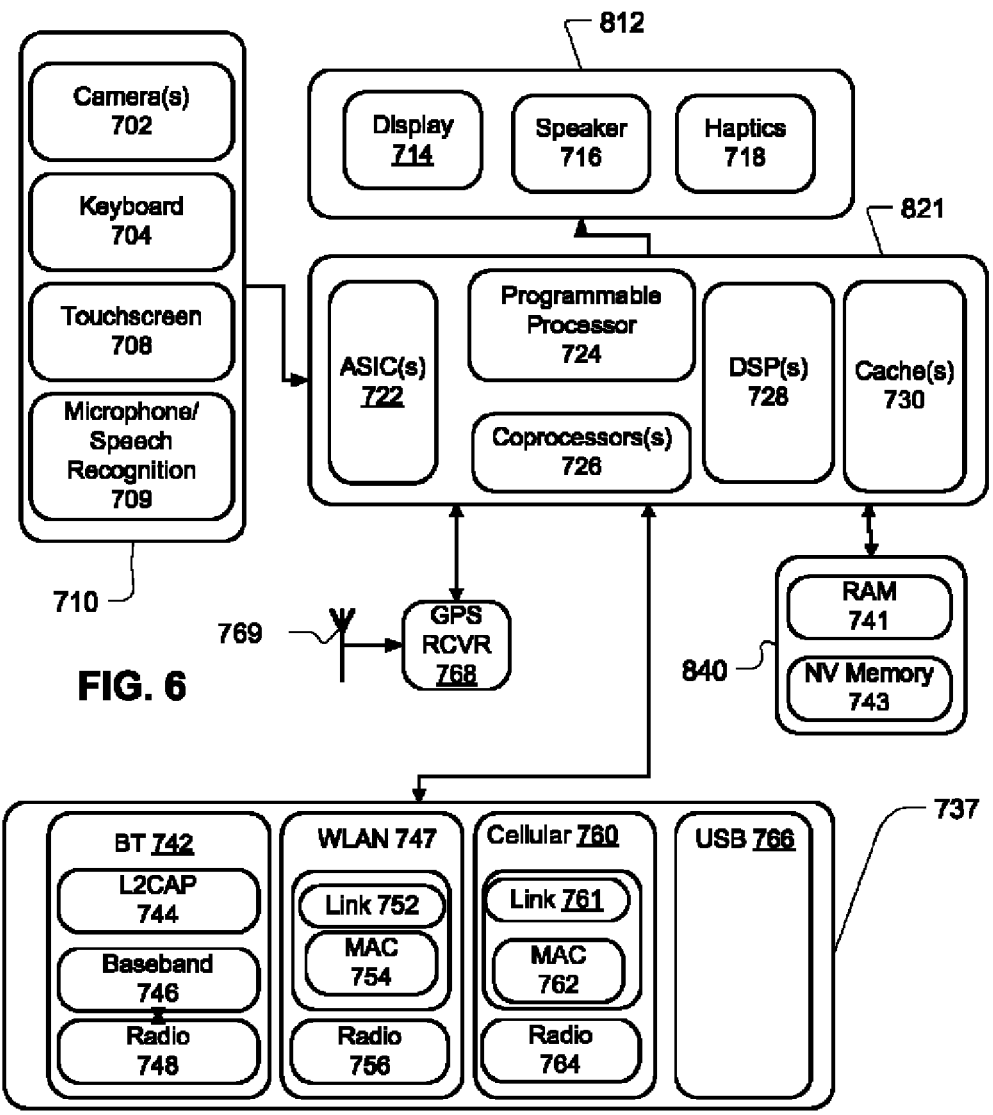
FIG. 6 depicts an example composition of a mobile device that can perform aspects in accordance with this disclosure.

FIG. 6 depicts example components that can be used in implementing a mobile transceiver device 11 according to the above description. FIG. 2 depicts that a processing module 721 may be composed of a plurality of different processing elements, including one or more ASICs 722, a programmable processor 724, one or more co-processors 726, which each can be fixed function, reconfigurable or programmable, one or more digital signal processors 728. For example, an ASIC or co-processor 722 may be provided for implementing graphics functionality, encryption and decryption, audio filtering, and other such functions that often involve many repetitive, math-intensive steps. Processing module 721 can comprise memory to be used during processing, such as one or more cache memories 730.

Processing module 721 communicates with mass storage 740, which can be composed of a Random Access Memory 741 and of non-volatile memory 743. Non-volatile memory 743 can be implemented with one or more of Flash memory, PROM, EPROM, and so on. Non-volatile memory 743 can be implemented as flash memory, ferromagnetic, phase-change memory, and other non-volatile memory technologies. Non-volatile memory 743 also can store programs, device state, various user information, one or more operating systems, device configuration data, and other data that may need to be accessed persistently.

User input interface 710 can comprise a plurality of different sources of user input, such as a camera 702, a keyboard 704, a touchscreen 708, and a microphone, which can provide input to speech recognition functionality 709.

Processing module 721 also can use a variety of network communication protocols, grouped for description purposes here into a communication module 737, which can include a Bluetooth communication stack 742, which comprises a L2CAP layer 744, a baseband 746 and a radio 748. Communications module 737 also can comprise a Wireless Local Area Network (747) interface, which comprises a link layer 752 with a MAC 754, and a radio 756. Communications module 737 also can comprise a cellular broadband data network interface 760, which in turn comprises a link layer 761, with MAC 762. Cellular interface 760 also can comprise a radio for an appropriate frequency spectrum 764. Communications module 737 also can comprise a USB interface 766, to provide wired data communication capability. Other wireless and wired communication technologies also can be provided, and this description is exemplary.

Figure 7:
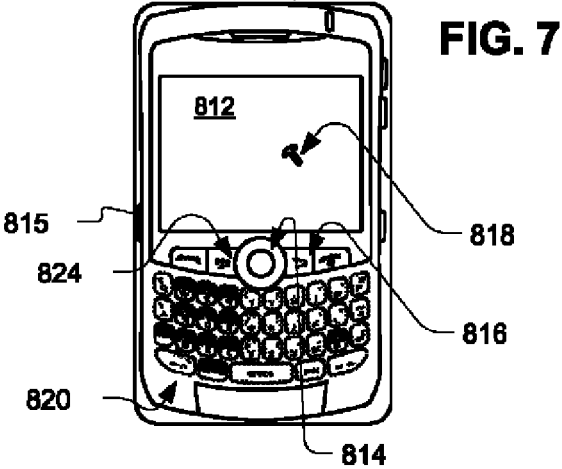
FIG. 7 depicts another view of an example of a mobile device that can perform aspects in accordance with this disclosure.

Referring to FIG. 7, there is depicted an example of mobile device 11. Mobile device 11 comprises a display 812 and a cursor or view positioning device, here depicted as a trackball 814, which may serve as another input member and is both rotational to provide selection inputs and can also be pressed in a direction generally toward housing to provide another selection input. Trackball 814 permits multi-directional positioning of a selection cursor 818, such that the selection cursor 818 can be moved in an upward direction, in a downward direction and, if desired and/or permitted, in any diagonal direction. The trackball 814 is in this example situated on a front face (not separately numbered) of a housing 820, to enable a user to maneuver the trackball 814 while holding mobile device 11 in one hand. In other embodiments, a trackpad or other navigational control device can be implemented as well.

Figure 8:
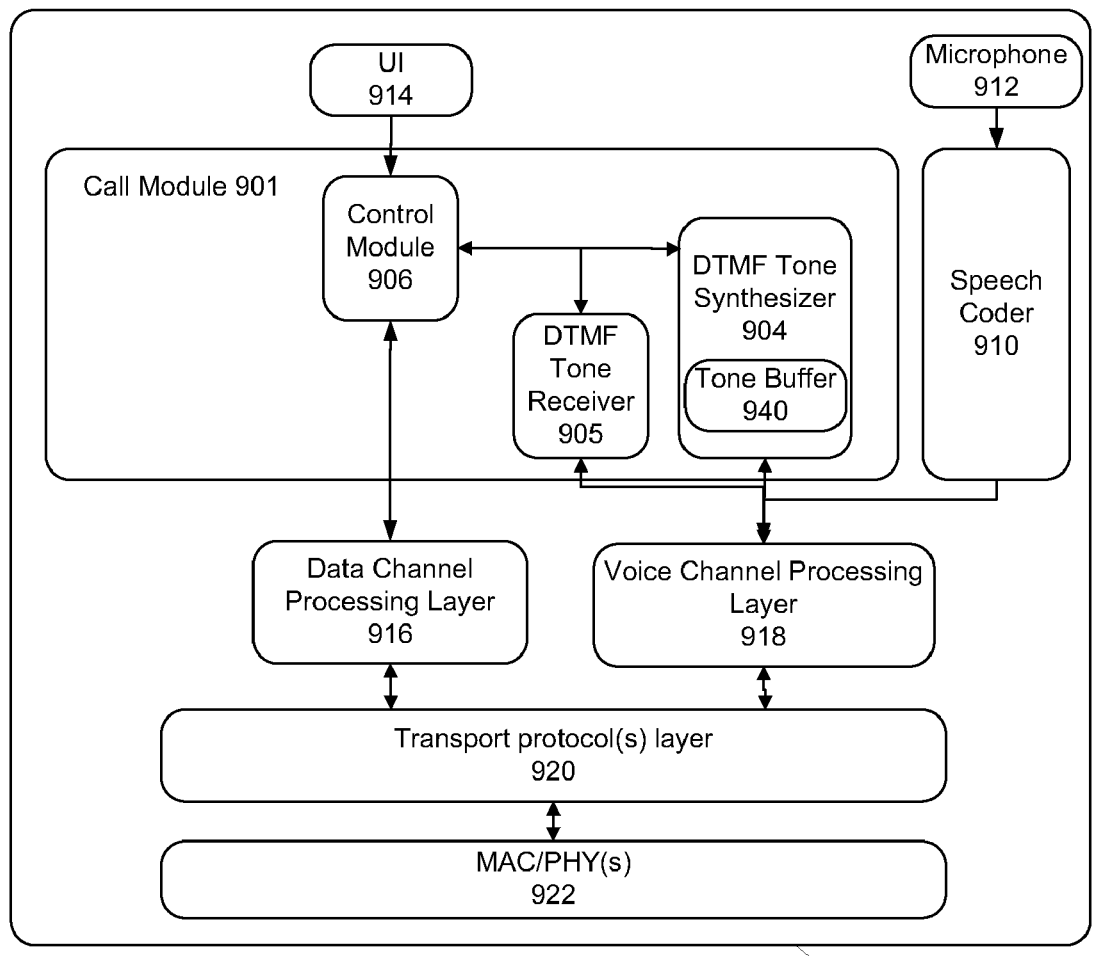
FIG. 8 depicts a functional module composition of a mobile device in accordance with this disclosure.

The mobile device 11 in FIG. 8 also comprises a programmable convenience button 815 to activate a selected application such as, for example, a calendar or calculator. Further, mobile device 11 can include an escape or cancel button 816, a menu or option button 824 and a keyboard 820. Menu or option button 824 loads a menu or list of options on display 812 when pressed. In this example, the escape or cancel button 816, menu option button 824, and keyboard 829 are disposed on the front face of the mobile device housing, while the convenience button 815 is disposed at the side of the housing. This button placement enables a user to operate these buttons while holding mobile device 11 in one hand. The keyboard 829 is, in this example, a standard QWERTY keyboard.

FIG. 8 depicts an example functional module organization of mobile device 11, and which includes a call module 901. Call module 901 device 11 includes Media Access Controller(s) and PHYsical media layers that can be managed by the MACs (922) and a transport protocol(s) module 920 interfaced with the MAC/PHYs. A voice channel processing layer module 918 interfaces with transport control (20), and receives input from a DTMF tone synthesizer and a speech code 910 that receives input from a microphone 912. Voice channel processing layer 918 also interfaces with a DTMF tone receiver 905 that can detect DTMF tones sent on a voice channel involving transport control 920 and MAC/PHY 922. A control module 906 also can interface with each of DTMF tone receiver 905 and synthesizer 904 to both receive information represented by received tones and generate information to be sent using DTMF tones. A UI 914 interfaces with control module 906. Transport module in turn interfaces with one or more MAC/PHY modules 922. Collectively, voice channel processing module 918, transport module 920, and MAC/PHY module(s) 922 provide a stack for transmission and reception of voice information for a call, as well as command and status information relating to such call.

In the foregoing, separate boxes or illustrated separation of functional elements of illustrated systems does not necessarily require physical separation of such functions, as communications between such elements can occur by way of messaging, function calls, shared memory space, and so on, without any such physical separation. As such, functions need not be implemented in physically or logically separated platforms, although they are illustrated separately for ease of explanation herein.

For example, different embodiments of devices can provide some functions in an operating system installation that are provided at an application layer or in a middle layer in other devices. Different devices can have different designs, such that while some devices implement some functions in fixed function hardware, other devices can implement such functions in a programmable processor with code obtained from a computer readable medium.

Further, some aspects may be disclosed with respect to only certain examples. However, such disclosures are not to be implied as requiring that such aspects be used only in embodiments according to such examples.

The above description occasionally describes relative timing of events, signals, actions, and the like as occurring "when" another event, signal, action, or the like happens. Such description is not to be construed as requiring a concurrency or any absolute timing, unless otherwise indicated.

Certain adaptations and modifications of the described embodiments can be made. Aspects that can be applied to various embodiments may have been described with respect to only a portion of those embodiments, for sake of clarity. However, it is to be understood that these aspects can be provided in or applied to other embodiments as well. Therefore, the above discussed embodiments are considered to be illustrative and not restrictive.

What is claimed is:

1. A method of establishing a voice call involving a mobile device, comprising:
   starting a local ring tone at the mobile device after sending voice call setup information from the mobile device on a data channel;
   receiving on a voice channel, at the mobile device, an incoming call;
   sending one or more primarily verification DTMF tones on the voice channel;

concurrently with the sending of the one or more primarily verification DTMF tones on the voice channel, restarting the local ring tone;

if the one or more primary verification tones are not acknowledged on the voice channel within a pre-determined delay, sending one or more secondary verification DTMF tones, different from the primary verification tones, on the voice channel; and if the one or more secondary verification DTMF tones are not acknowledged within the pre-determined delay, repeating the sending of the one or more primary verification DTMF tones.

2. The method of claim 1, wherein the one or more primarily verification DTMF tones comprise DTMF tones representing a first sequence of numerals.

3. The method of claim 2, wherein the one or more secondary verification DTMF tones comprise DTMF tones representing a second sequence of numerals, different from the first sequence.

4. The method of claim 1, further comprising establishing a further call by sending digits for another party to be called, and during the sending, starting a local ring tone cycle, after the sending is completed, stopping the local ring tone and waiting for arrival of a remote ring tone status update.

5. The method of claim 4, further comprising restarting the remote ring tone status update, and waiting for a confirmation that the further call has been answered.

\* \* \* \* \*